(12) United States Patent
Skaljak et al.

(10) Patent No.: US 10,042,469 B2
(45) Date of Patent: *Aug. 7, 2018

(54) METHODS AND APPARATUS FOR REDUCING PERCEIVED PEN-TO-INK LATENCY ON TOUCHPAD DEVICES

(71) Applicant: NVIDIA Corporation, Santa Clara, CA (US)

(72) Inventors: Bojan Skaljak, San Jose, CA (US); Arman Toorians, San Jose, CA (US); Michael Chu, Cupertino, CA (US)

(73) Assignee: Nvidia Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/365,620

(22) Filed: Nov. 30, 2016

(65) Prior Publication Data

US 2017/0177146 A1    Jun. 22, 2017

Related U.S. Application Data

(63) Continuation of application No. 14/015,958, filed on Aug. 30, 2013, now Pat. No. 9,529,525.

(51) Int. Cl.
| | |
|---|---|
| *G06F 3/041* | (2006.01) |
| *G06F 3/0354* | (2013.01) |
| *G06T 1/60* | (2006.01) |
| *G06F 3/038* | (2013.01) |

(52) U.S. Cl.
CPC .......... *G06F 3/0416* (2013.01); *G06F 3/038* (2013.01); *G06F 3/03545* (2013.01); *G06T 1/60* (2013.01); *G06F 2203/04106* (2013.01)

(58) Field of Classification Search
CPC .... G06F 3/0416; G06F 3/038; G06F 3/03545; G06F 2203/04106; G06T 1/60
See application file for complete search history.

(56) References Cited

U.S. PATENT DOCUMENTS

| | | | | |
|---|---|---|---|---|
| 5,995,081 | A * | 11/1999 | Kato | G06T 11/203 178/18.01 |
| 9,218,094 | B1 * | 12/2015 | Slezinskyy | G06F 3/0488 |
| 2009/0167727 | A1 | 7/2009 | Liu et al. | |
| 2009/0262637 | A1 | 10/2009 | Badaye et al. | |
| 2010/0245286 | A1 * | 9/2010 | Parker | G06F 3/0416 345/174 |

(Continued)

*Primary Examiner* — Amare Mengistu
*Assistant Examiner* — Jennifer Zubajlo

(57) ABSTRACT

A method for reducing line display latency on a touchpad device is disclosed. The method comprises storing information regarding a plurality of prior touch events on a touch screen of the touchpad device into an event buffer. It further comprises determining an average speed and a predicted direction of motion of a user interaction with the touch screen using the plurality of prior touch events. Next, it comprises calculating a first prediction point using the average speed, the predicted direction, and a last known touch event on the touch screen. Subsequently, it comprises applying weighted filtering on the first prediction point using a measured line curvature to determine a second prediction point. Finally, it comprises rendering a prediction line between the last known touch event on the touch screen and the second prediction point.

18 Claims, 10 Drawing Sheets

(56) References Cited

U.S. PATENT DOCUMENTS

| | | | |
|---|---|---|---|
| 2010/0283752 A1* | 11/2010 | Maeda | G06F 3/0416 345/173 |
| 2011/0261026 A1 | 10/2011 | Kim et al. | |
| 2011/0273376 A1 | 11/2011 | Dickinson et al. | |
| 2011/0304577 A1* | 12/2011 | Brown | G06F 3/03545 345/174 |
| 2012/0146957 A1 | 6/2012 | Dunagan | |
| 2012/0154324 A1* | 6/2012 | Wright | G06F 3/0416 345/174 |
| 2012/0223894 A1* | 9/2012 | Zhao | G06F 3/0488 345/173 |
| 2012/0327041 A1 | 12/2012 | Harley et al. | |
| 2013/0044078 A1 | 2/2013 | Hallenberg et al. | |
| 2013/0100071 A1* | 4/2013 | Wright | G06F 1/3262 345/174 |
| 2013/0135191 A1* | 5/2013 | Shiokawa | G06F 3/017 345/156 |
| 2013/0154983 A1* | 6/2013 | Christiansson | G06F 3/0416 345/173 |
| 2013/0194242 A1 | 8/2013 | Park et al. | |
| 2013/0249823 A1 | 9/2013 | Ahn et al. | |
| 2013/0271487 A1* | 10/2013 | Lincoln | G06F 3/0488 345/619 |
| 2014/0028633 A1 | 1/2014 | Mercea et al. | |
| 2014/0139462 A1* | 5/2014 | Lin | G06F 3/0418 345/173 |
| 2014/0168142 A1* | 6/2014 | Sasselli | G06F 3/0416 345/174 |
| 2014/0204036 A1* | 7/2014 | Schillings | G06F 3/0418 345/173 |
| 2014/0204126 A1* | 7/2014 | Mankowski | G06F 3/038 345/646 |
| 2014/0267192 A1 | 9/2014 | Matsuura et al. | |
| 2015/0015497 A1* | 1/2015 | Leigh | G06F 3/0416 345/173 |
| 2015/0029163 A1 | 1/2015 | Harris et al. | |

\* cited by examiner

```
602 ──▶ vec2 filterPP(vec2 PP, float curvature)
       {
604 ──▶   vec2 FPP = {0,0};
606 ──▶   float w = 1; float weight = 0;
608 ──▶   buffer.addFront(PP);    // important, adding PP as first element
610 ──▶   for(each event in buffer starting with the first one) {
612 ──▶     FPP += event.pos * w;
614 ──▶     weight +=w;
616 ──▶     w *= curvature;       // exponential back-off
          }
618 ──▶   FPP /= weight;
620 ──▶   buffer.removeFirst();   // we are done, remove PP from the buffer
622 ──▶   return FPP;
       }
```

Note: If curvature is close to 0 (straight line) FPP = PP/1 = PP, if curvature is close to 1 (very curvy line) FPP = (PP*1+Pn*1+Pn-1*1+...+P1*1)/(n+1).

FIG. 6

METHODS AND APPARATUS FOR REDUCING PERCEIVED PEN-TO-INK LATENCY ON TOUCHPAD DEVICES

The present application is a continuation of U.S. patent application Ser. No. 14/015,958, filed Aug. 30, 2013, entitled "METHODS AND APPARATUS FOR REDUCING PERCEIVED PEN-TO-INK LATENCY ON TOUCHPAD DEVICES," naming Bojan Skaljak, Arman Toorians and Michael Chu as inventors, which is herein incorporated by reference in its entirety.

FIELD OF THE INVENTION

Embodiments according to the present invention generally relate to touchpad devices and more specifically to methods for processing touch events on touch screens for touchpad devices.

BACKGROUND OF THE INVENTION

Touchpad based devices typically suffer from a common problem. When a stylus or similar device is used to draw a line or write some text on the touch screen of a touchpad device, there is a noticeable time lag between the actual pen movement and the "digital ink" appearing on screen. FIG. 1 is an exemplary illustration of "pen-to-ink" latency on a touchpad device. Stylus 120 is used to draw a line on touch screen 122 of device 112. As shown on touch screen 122, there is a time lag between the current position 126 of the stylus and the digital ink 125 being shown on the screen as it updates in response to the user's motion.

This pen-to-ink latency is caused by a combination of factors, including hardware, software and operating system (OS) related factors and varies from device to device. FIGS. 2A and 2B illustrate how, for example, pen-to-ink latency can be quantified as a result of the way in which the touchpad device processes user-initiated events in connection with displaying frames of display information. Specifically, FIG. 2A illustrates how a conventional touchpad device processes frames of pixel information. FIG. 2B illustrates how user initiated events are processed to be displayed on the screen of a conventional touchpad device.

A conventional device, e.g., an Android touchpad device running the JellyBean operating system, may typically refresh screen content at a 60 Hz frequency. Accordingly, the screen is refreshed 60 times each second and each update takes around 16.66 ms (1000 ms/60=16.66 ms). In other words, there are 60 display updates within a second and, as a result, the device has around 16 ms to prepare each frame before it gets presented to the user. As shown in FIG. 2A, each frame, e.g. Frame 0 202 and Frame 1 204, is 16.66 ms long and gets refreshed and replaced by a fresh frame at the v-sync 202 boundary at the end of every 16.66 ms interval.

In a conventional touchpad device, during the frame preparation time all touch events are collected and delivered to an application, e.g., a drawing application, on the next v-sync boundary. For example a user touch event 250 during Frame 0 212 will not be delivered to the application until v-sync 254. Assuming the application uses single buffering, this results in a minimum 16 ms delay before results of the user interaction are actually presented on display. However, most operating systems on conventional devices, e.g. Jelly-Bean, use triple buffering which make the delay even larger.

Multiple buffering comprises the use of more than one buffer to hold a block of data so that a reader will see a complete version of the data rather than a partially updated version of the data being created by a writer. Triple buffering is a technique that uses three buffers to reduce or avoid the problems single buffering can cause. Typically, the front buffer holds the image currently being displayed. The middle buffer holds a completed image until the front buffer is ready to display it. When the current frame finishes displaying, the front buffer and middle buffer switch. The back buffer holds the image being drawn. When the graphics processing unit (GPU) finishes drawing, the back buffer and the middle buffer switch. Using three buffers decouples the drawing process from the display process. This allows a consistent high frame rate to be achieved using v-sync, even if frame drawing takes longer than the frame display time.

FIG. 2B illustrates how triple buffering increases the perceived pen-to-ink latency on screen. During Frame 0 212, for example, the application is rendering to the Frame Buffer 0 (FB0) and at v-sync 254, it displays the contents of Frame Buffer 2 (FB2). During Frame 1 214, the application is rendering to FB2 and displays the contents of Frame Buffer 1 (FB1) at v-sync 255. The touch event 250 that gets delivered at v-sync 254 gets rendered into FB2 during Frame 1 214. Thus, by virtue of the operating system framework, there is already a default touch-delivery latency (TDL) 280 introduced before a touch event is even delivered and processed due to the sample rate of the touch screen itself. In other words, the TDL latency is due to the sample frequency of the touch screen itself and is different from the latency added as a result of the display refresh rate. During Frame 2 216, the frame buffers cycle again and render to FB1 while displaying the contents of FB0 at v-sync 256. Finally, during Frame 3 218, the application renders to FB0 and displays the contents of FB2 at v-sync 257.

The touch event 250 that was rendered into FB2 at the beginning of Frame 1 214 finally gets displayed on screen at v-sync 257. Accordingly, the perceived pen-to-ink latency in a conventional touchpad device with triple buffering is between 48 and 64 ms (3×16 ms+TDL {0-16 ms depending on when the touch event occurred during the frame}). Assuming an average of 8 ms for the TDL, typical applications on conventional touchpad devices have a 56 ms perceived pen-to-ink latency.

Finally, additional latency that may need to be accounted for is latency between the physical movement of the stylus and touch event 250 delivery to the operating system caused by hardware and the driver. Accordingly, the total latency may be higher than 64 ms.

High latency results in lack of responsiveness and may lead to poor user experience, which can ultimately be a decisive factor in a consumer's decision whether to purchase a certain device. Further, prior ways of trying to reduce latency related issues are unsatisfactory. For example, the latency can be improved by using single or double buffering instead of triple buffering because it reduces the number of buffers that need to be cycled through before an event is displayed on screen. However, this is unsatisfactory because the advantages of triple buffering, e.g., a high frame rate are lost.

BRIEF SUMMARY OF THE INVENTION

Accordingly, a need exists for systems and methods for reducing perceived pen-to-ink latency on touchpad devices by performing motion estimation and using the estimation to draw predictive lines on the touchpad screen, wherein the predictive lines reduce the user's perceived pen-to-ink latency. In one embodiment, the present invention computes the average speed of a stylus computes an estimated curvature of the line being drawn by the user and predicts a direction to perform motion estimation and then generates a predictive line segment.

Embodiments of the present invention can efficiently reduce perceived pen-to-ink latency without sacrificing the use of triple and double buffering by predicting pen movement to display predictive line segments and performing quick corrections once real touch events are processed. The prediction advantageously increases perceived responsiveness of the touch screen and makes touchpad devices feel more user interactive.

In one embodiment, a method for reducing display latency on a touchpad device is disclosed. The method comprises storing information regarding a plurality of prior touch events on a touch screen of the touchpad device into an event buffer. It further comprises determining an average speed and a predicted direction of motion regarding a user interaction with the touch screen using the plurality of prior touch events. Subsequently, it comprises calculating a prediction point using the average speed, the predicted direction, and a last known touch event on the touch screen. Finally, it comprises rendering a prediction line between the last known touch event on the touch screen and the prediction point.

In another embodiment, a non-transitory computer-readable storage medium having stored thereon, computer executable instructions that, if executed by a computer system cause the computer system to perform a method for reducing display latency on a touchpad device is disclosed. The method comprises storing information regarding a plurality of prior touch events on a touch screen of the touchpad device into an event buffer. It further comprises determining an average speed and a predicted direction of motion of a user interaction with the touch screen using the plurality of prior touch events. Next, it comprises calculating a first prediction point using the average speed, the predicted direction, and a last known touch event on the touch screen. Subsequently, it comprises applying weighted filtering on the first prediction point using a measured line curvature to determine a second prediction point. Finally, it comprises rendering a prediction line between the last known touch event on the touch screen and the second prediction point.

In a different embodiment an apparatus to perform a method for reducing line display latency on touchpad devices is disclosed. The apparatus comprises a body, a bus, a touch screen display, wherein the touch screen display is operable to receive a user input through touch, a memory and a processor communicatively coupled to the memory and to the touch screen display via the bus, wherein the processor is configured to: (a) store information regarding a plurality of prior touch events on the touch screen display into an event buffer; (b) determine an average speed and a predicted direction of motion of a user interaction with the touch screen display using the plurality of prior touch events; (c) calculate a first prediction point using the average speed, the predicted direction, and a last known touch event on the touch screen display; (d) apply weighted filtering on the first prediction point using a measured line curvature to determine a second prediction point; and (e) render a prediction line between the last known touch event on the touch screen display and the second prediction point.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 6 illustrates pseudo-code for a computer controlled process that generates a final predictive point by accounting for the curvature of the user drawn line in accordance with one embodiment of the present invention.

Figure 1:
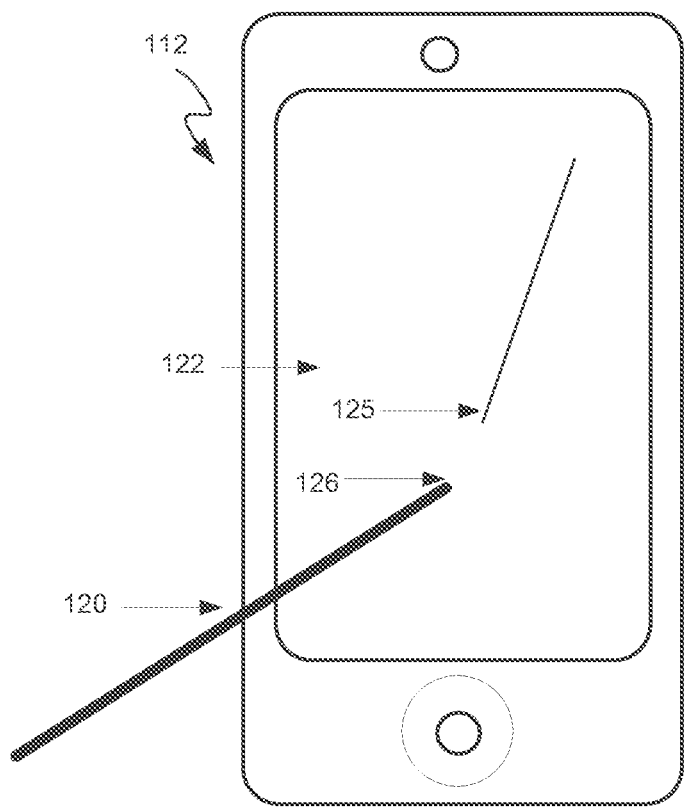
FIG. 1 is an exemplary illustration of "pen-to-ink" latency on a touchpad device.
Figure 2A:
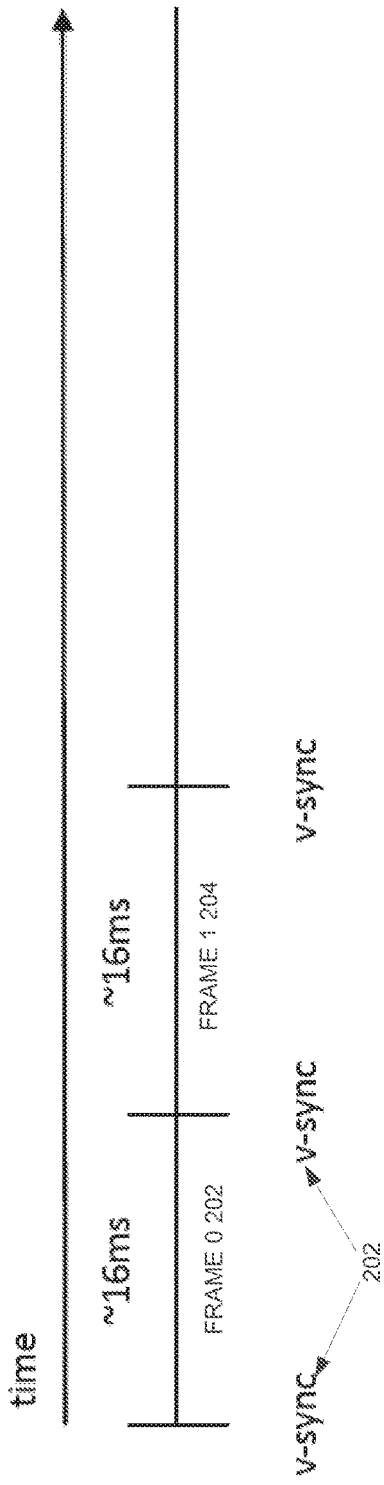
FIG. 2A illustrates how a conventional touchpad device processes frames of pixel information.
Figure 2B:
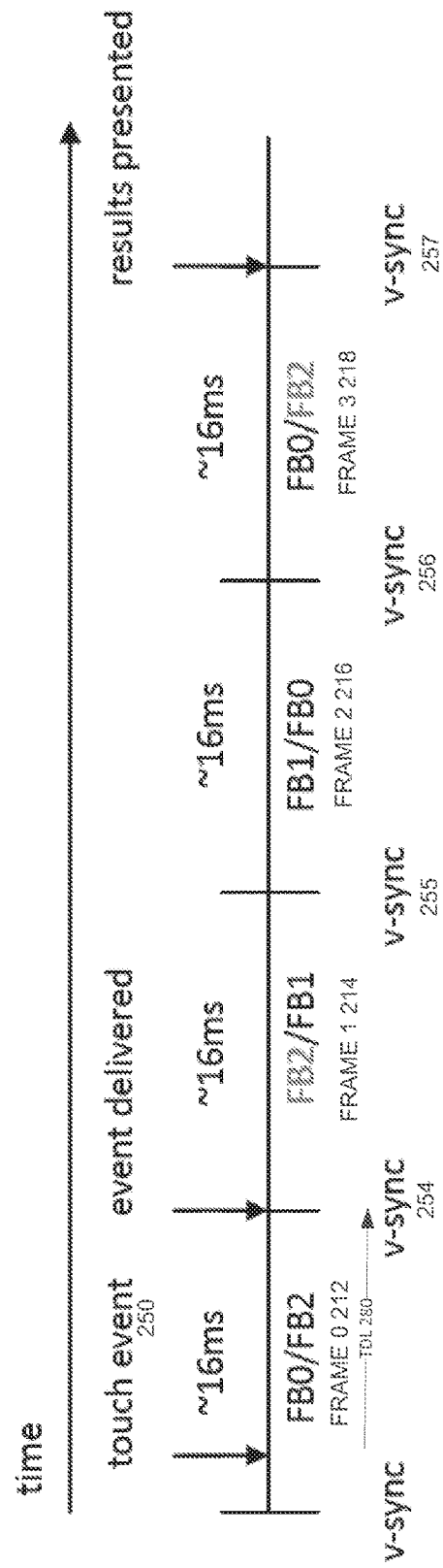
FIG. 2B illustrates how user initiated events are processed to be displayed on the screen of a conventional touchpad device.

In the figures, elements having the same designation have the same or similar function.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

NOTATION AND NOMENCLATURE

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "calculating," "applying," "adding," and "plotting," or the like, refer to actions and processes (e.g., flowchart 800 of FIG. 8) of a computer system or similar electronic computing device or processor (e.g., system 300 of FIG. 3). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 3:
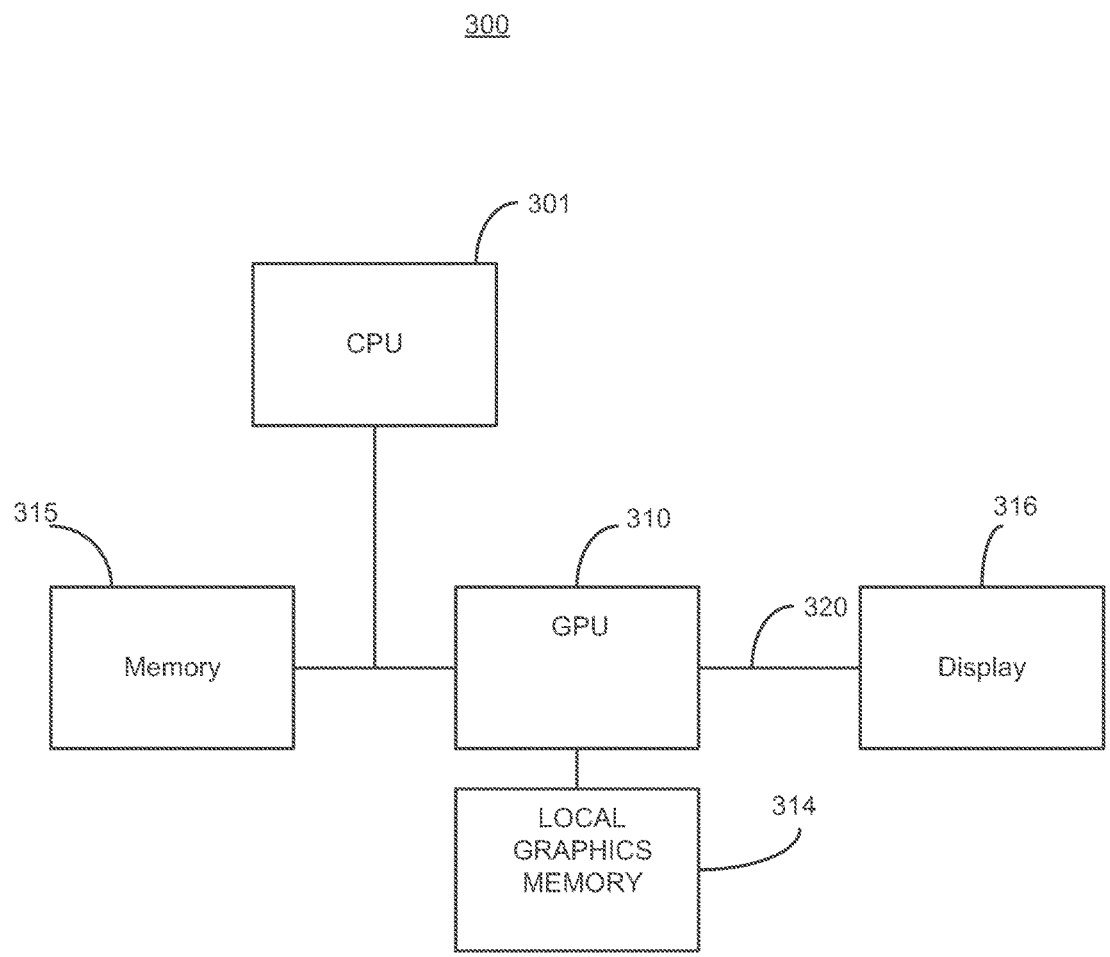
FIG. 3 shows an exemplary computer system used to execute touchpad applications in accordance with one embodiment of the present invention.

FIG. 3 shows an exemplary computer system used to execute touchpad applications in accordance with one embodiment of the present invention. Computer system 300 depicts the components of a generic computer system in accordance with embodiments of the present invention providing the execution platform for certain hardware-based and software-based functionality. In general, computer system 300 comprises at least one CPU 301, a system memory 315, and at least one graphics processor unit (GPU) 310. The CPU 301 can be coupled to the system memory 315 via a bridge component/memory controller (not shown) or can be directly coupled to the system memory 315 via a memory controller (not shown) internal to the CPU 301. The GPU 310 may be coupled to a display 316 through a bus 320. In one embodiment, display 316 can be a touch screen of a handheld device, e.g., a touchpad, phone, laptop computer etc. One or more additional GPUs can optionally be coupled to system 300 to further increase its computational power. The GPU(s) 310 is coupled to the CPU 301 and the system memory 315. The GPU 310 can be implemented as a discrete component, a discrete graphics card designed to couple to the computer system 300 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 314 can be included for the GPU 310 for high bandwidth graphics data storage.

The CPU 301 and the GPU 310 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 310 can also be implemented in, and performed by, a suitably equipped CPU 301. Additionally, while embodiments herein may make reference to a GPU, it should be noted that the described circuits and/or functionality can also be implemented and other types of processors (e.g., general purpose or other special-purpose coprocessors) or within a CPU.

System 300 can be implemented as, for example, a desktop computer system or server computer system having a powerful general-purpose CPU 301 coupled to a dedicated graphics rendering GPU 310. In such an embodiment, components can be included that add peripheral buses, specialized audio/video components, IO devices, and the like. Similarly, system 300 can be implemented as a handheld device (e.g., cell-phone, etc.), direct broadcast satellite (DBS)/terrestrial set-top box or a set-top video game console device. System 300 can also be implemented as a "system on a chip", where the electronics (e.g., the components 301, 315, 310, 314, and the like) of a computing device are wholly contained within a single integrated circuit die. Examples include a hand-held instrument with a display, a car navigation system, a portable entertainment system, and the like.

Methods and Apparatus for Reducing Perceived Pen-to-Ink Latency on Touchpad Devices When a stylus is used on a touchpad device, there can be a noticeable lag between user action, e.g., drawing a line and the actual action being performed on the device. Embodiments of the present invention provide for systems and methods for reducing perceived pen-to-ink latency on touchpad devices by performing motion estimation and using the estimation to draw predictive line segments on the touchpad screen, wherein the predictive lines reduce the user's perceived pen-to-ink latency. In one embodiment, the present invention computes the average speed of a stylus computes an estimated curvature of the line being drawn by the user and predicts a direction to perform motion estimation and then generates a predictive line segment.

Embodiments of the present invention can efficiently reduce perceived pen-to-ink latency without sacrificing the use of triple and double buffering by predicting pen movement to display predictive line segments and performing quick corrections once real touch events are processed. The prediction advantageously increases perceived responsiveness of the touch screen and makes touchpad devices feel more user interactive. Further, it more closely emulates drawing on a piece of actual paper with a pen and, therefore, feels more natural and closer to real life scenarios for a user. Accordingly, a user does not have to be distracted by the digital ink on screen trailing behind the stylus.

Figure 4:
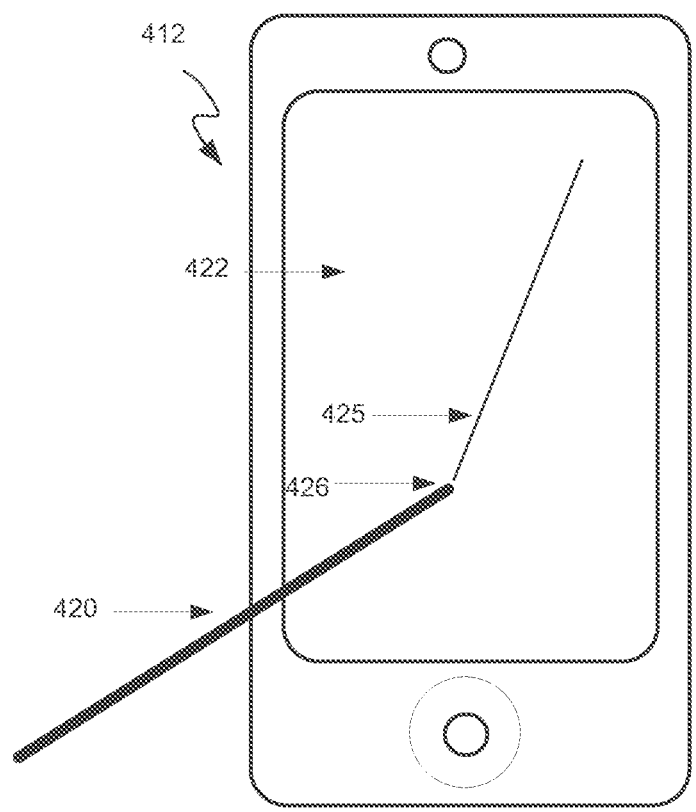
FIG. 4 is an exemplary illustration of reduced "pen-to-ink" latency on a touchpad device in accordance with one embodiment of the present invention.

FIG. 4 is an exemplary illustration of reduced "pen-to-ink" latency on a touchpad device in accordance with one embodiment of the present invention. As shown on touch screen 422 for device 412, the perceived lag is reduced between the current position 426 of the stylus 420 and the digital ink 425 being shown on the screen as it updates in response to the user's motion. This is in direct contrast to the significant lag experienced for device 112 shown in FIG. 1.

In one embodiment of the present invention, data related to all incoming touch events on a touch-screen of a touchpad device is stored in an event buffer. In one embodiment, this data can comprise an X-Y position of the touch event, size of the touch event, pressure of the touch event and timestamp. The event buffer, in one embodiment, can comprise 64 entries, but the size of the buffer can be variable in other embodiments. As the touch events from a user's input start getting recorded, the entries in the buffer fill up with data related to the touch events. Information from these entries is used to generate predictive lines that result in reduced pen-to-ink latency. Because the buffer is fixed size, entries can be replaced based on a Least Recently Used (LRU) policy, however, in other embodiments, other replacement policies can also be utilized. The events recorded in the event buffer are used to calculate average speed of the stylus (or other device), predicted direction and measure curvature of the line, all of which are used in determining the predictive lines.

Figure 5:
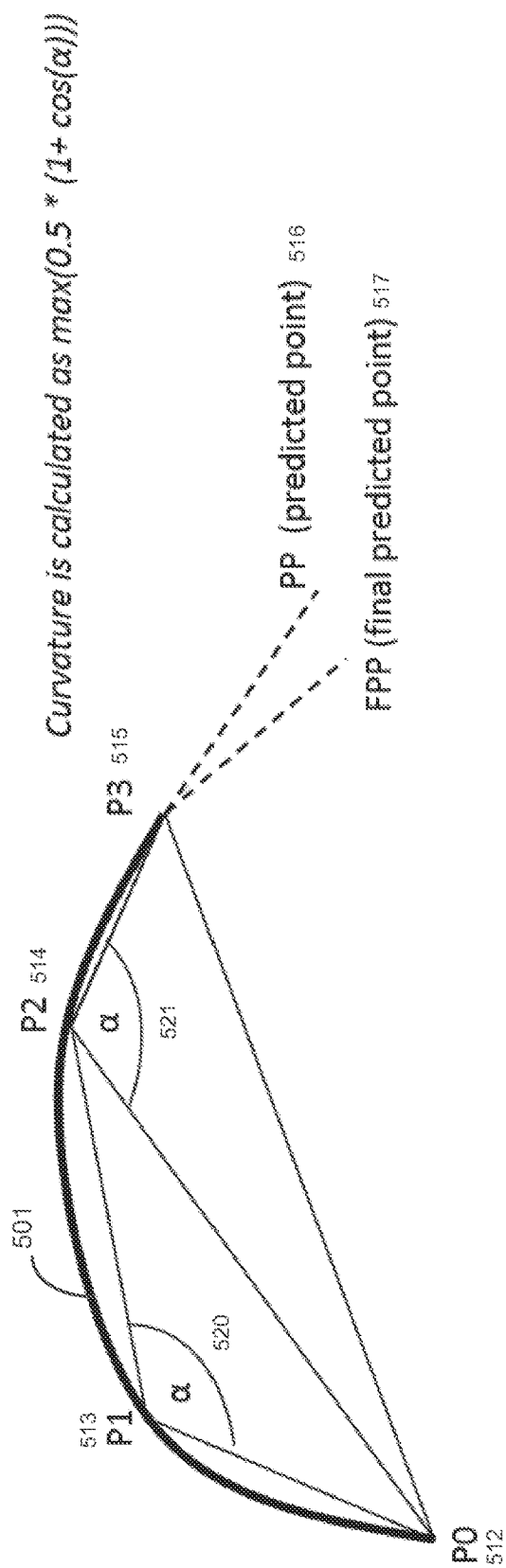
FIG. 5 is an exemplary illustration of predictive points determined for a curved line drawn by a user of a touchpad device in accordance with one embodiment of the present invention.

FIG. 5 is an exemplary illustration of predictive points determined for a curved line drawn by a user of a touchpad device in accordance with one embodiment of the present invention. The example shown in FIG. 5 has a line comprising four detected points, P0 512, P1 513, P2 514 and P3 515, corresponding to four detected touch events by a user. It will be appreciated that although each event has been represented as a point, P0-P3, each point is an event comprising information regarding position, size, pressure and time. Although the event buffer can store 64 or more entries, all of which may be used in order to generate points on a predictive line, for simplicity's sake, the example in FIG. 5 illustrates how predictive points for the curved line 501 can be generated using events P0 to P3.

As mentioned above, in order to reduce the perceived latency, the touchpad application needs to generate predicted points that are closer to the stylus than the actual points processed and displayed through the frame buffer mechanism. In other words, the predictive line drawn by embodiments of the present invention needs to cover the gap between the last known user-initiated touch event appearing on screen and the current position of the stylus. A predicted point (PP) 516 can be calculated using the following formula:

$$PP = LKP + NPD*(APL+TDL)*AS \quad (1)$$

PP in formula (1) is the predicted point, LKP is the last known point, NPD is the normalized prediction direction, APL is pen latency (estimated average pen-to-ink latency measured with high-speed camera), TDL is touch delivery latency, and AS is the average pen speed measured in pixels/ms.

In order to generate predicted point (PP) 516, for example, the application first determines the average speed at which a user's stylus or finger is moving. In order to calculate AS, in one embodiment, the application uses the X-Y position coordinates stored in the prior entries in the event buffer to determine the overall distance the stylus has traveled. It also uses the timestamps of the prior entries to determine the amount of time it took to travel the distance. Using the distance and time values, the average speed of the stylus can be determined.

In order to determine the NPD, in one embodiment, the application can use the most recent points, e.g., P3 515 and P2 514 and average the directional vectors from those points to determine a vector that predicts the direction of the user's movement. In other words, NPD is a directional vector averaged from prior vectors. In different embodiments, varying number of recent points can be used to determine the NPD vector.

As mentioned above, APL is an estimated pen-to-ink latency normally measured with a high speed camera. This latency may differ between devices. TDL, as discussed above, is the touch delivery latency, which can vary between 0 and 16.66 ms. Accordingly, total latency (APL+TDL) will also vary for different devices. However, once total latency for a particular device is determined, it can be used as a constant value in calculations to determine the predictive points.

The product of the total latency (APL+TDL), NPD and PP is added to the last known point (LKP) to determine the PP.

As shown in FIG. 5, if embodiments of the present invention use the PP 516 derived from the above described formula, certain undesired artifacts will result if the user is drawing a curved line. Because PP 516 does not take into account the curvature of the line, it may be slightly offset at a tangential point from where the user intended to draw the line as shown in FIG. 5. This will result in artifacts on-screen and the user will perceive the predictive line as being at a slight offset from the user's intended direction. In order to correct for these artifacts, the application takes into account the curvature of the user drawn line. Accordingly, it is helpful to have multiple events recorded in the event buffer because the more events that the application procedure has access to, the better the estimation of curvature will be.

To minimize artifacts, the procedure applies weighted filtering on the predicted point PP 516 using the measured line curvature and previous touch events to generate final predicted point (FPP) 517. Embodiments of the present invention first determine the curvature of the user drawn line using the following formula:

Curvature=max $(0.5*(1+\cos(\alpha)))$ (2), wherein a is the vertex angle for triangles constructed in memory using each point on the line for which there is a corresponding event in the buffer, and the points prior and subsequent to that point. For example, triangle 520 in FIG. 5 is drawn for point P1 513 using points P2 514 and P0 512. Similarly, triangle 521 is drawn for point P2 514 using point P3 515 and P0 512. Stated differently, the procedure constructs a triangle in memory for every point corresponding to an event in the buffer and, subsequently, the curvature value is calculated as the maximum of the function $0.5*(1+\cos(\alpha))$, where a is the vertex angle for the triangles.

The curvature will be in the range from 0 to 1, wherein 0 represents a straight line, and 1 represents a very curvy line. For example, a straight line will have an a of 180 degrees, which will result in the function $0.5*(1+\cos(\alpha))$ having a value of 0 (cosine (180 degrees)=−1).

FIG. 6 illustrates exemplary pseudo-code for a computer controlled process that generates a final predictive point by accounting for the curvature of the user drawn line in accordance with one embodiment of the present invention.

At step 602, the function filterPP uses the calculated PP and curvature values as parameters in order to determine the vector for the FPP.

At step 604 of the pseudo-code, the x and they coordinates for the final predicted point are initialized to zero.

At step 606, the scaling factor "w" is initialized to 1. The scaling factor "w" determines the impact of each prior event on the FPP as will be explained below. Further the "weight" variable is also initialized to 0.

At step 608, the calculated PP, e.g., PP 516 that was passed into function filterPP as a parameter at step 602 is added to the front of the event buffer.

Subsequently, starting at step 610, an iterative loop is initiated which cycles through each event in the event buffer starting with the first one. As indicated above, PP 516 is added to the front of the event buffer at step 608.

At step 612, the FPP variable accumulates the value of an event in the event buffer multiplied by the "w" scalar. For the first iteration of the loop, the first item in the buffer, which is the PP, will be multiplied by a value of 1, which is the initial value of "w". Because the scalar "w" value falls below 1 in subsequent iterations, depending on the curvature of the line, the FPP variable value will be most heavily weighted by PP.

At step 614, the variable "weight" accumulates the value of the scalar "w" used in each iteration of the loop.

At step 616, scaling factor "w" accumulates the product of curvature with the prior value of "w." Assuming a curvature of between 0 and 1, in effect, this allows the impact of earlier points in the buffer to be less as compared to the later points in the buffer. For example, the accumulated value of the FPP variable for the example used in FIG. 5 at the end of iterative loop 610, will be the following:

$$\text{FPP}=\text{PP}516+P3\ 515*\text{curvature}+P2\ 514*\text{curvature}*\text{curvature}+P1\ 513*\text{curvature}*\text{curvature}*\text{curvature}+P0 512*\text{curvature}*\text{curvature}*\text{curvature}*\text{curvature}. \quad (3)$$

If the value for curvature is less than 1, then the value of FPP will be most heavily weighted by PP 516 and every subsequent point will have a progressively smaller impact.

At step 618, following the iterative loop, the accumulated value of FPP is divided by the "weight" variable to determine the final predicted point. At step 620, the PP is removed from the front of the event buffer and finally, at 622, the final predicted point value is returned by function filterPP.

As a result of the procedure described in FIG. 6, the final prediction point FPP 517 is pulled more towards the center of the curve, thereby, reducing artifacts when trying to predict rapid pen movement on a curve.

Figure 7:
FIG. 7 is an exemplary illustration of determining predictive points for a straight line drawn by a user of a touchpad device in accordance with one embodiment of the present invention.

FIG. 7 is an exemplary on-screen illustration of determining predictive points for a straight line drawn by a user of a touchpad device in accordance with one embodiment of the present invention. If the user's stylus is moving on a straight line as shown in FIG. 7, the curvature coefficient will be close to 0. As a result, scalar "w" will be 0 for every other point on the line, in accordance with step 616, except the initial one. In other words, because the line has no curvature, the prior points in the buffer will not need to be accounted for in determining the final predicted point from the predicted point. Accordingly, the final predicted point, FPP 720, will be the same as PP.

On the other hand, if the line is extremely curvy, and the curvature coefficient is 1, then all the prior events in the buffer will receive an equal weighting in the final determination of FPP. FPP, in this case, will be determined by the following formula (4):

$$\text{FPP}=(\text{PP}*1+*P_n*1+P_{n-1}*1+\ldots +P1*1)/(n+1) \quad (4)$$

After FPP is calculated, the procedure simply plots the predictive line between the last known point of the stylus and the FPP. In one embodiment, the predictive line can be plotted using a different screen attribute, e.g., a line of a different weight or different color.

In one embodiment, once a new touch event has been received, the procedure removes the predictive line by performing a quick undo and plots the actual line based on user input. As mentioned above, it can take anywhere from 48 ms to 64 ms for actual touch data to be presented on-screen. The predictive line allows this gap to be bridged. It should be noted that the on-screen canvas is split into a grid of tiles to speed up the prediction undo process and overall application responsiveness. In effect, the tiles with the prediction line are simply swapped out with tiles comprising real touch data when the real touch data is ready. Because the undo and re-plotting processes are very rapid, no artifacts are perceived on screen by the user.

In one embodiment, the procedure can be trained to learn from any erroneous predictions. For example, if the user has a tendency to have shaky hands, the procedure may be trained to reduce the impact of erroneous predictions by adjusting the curvature coefficient higher.

Figure 8A:
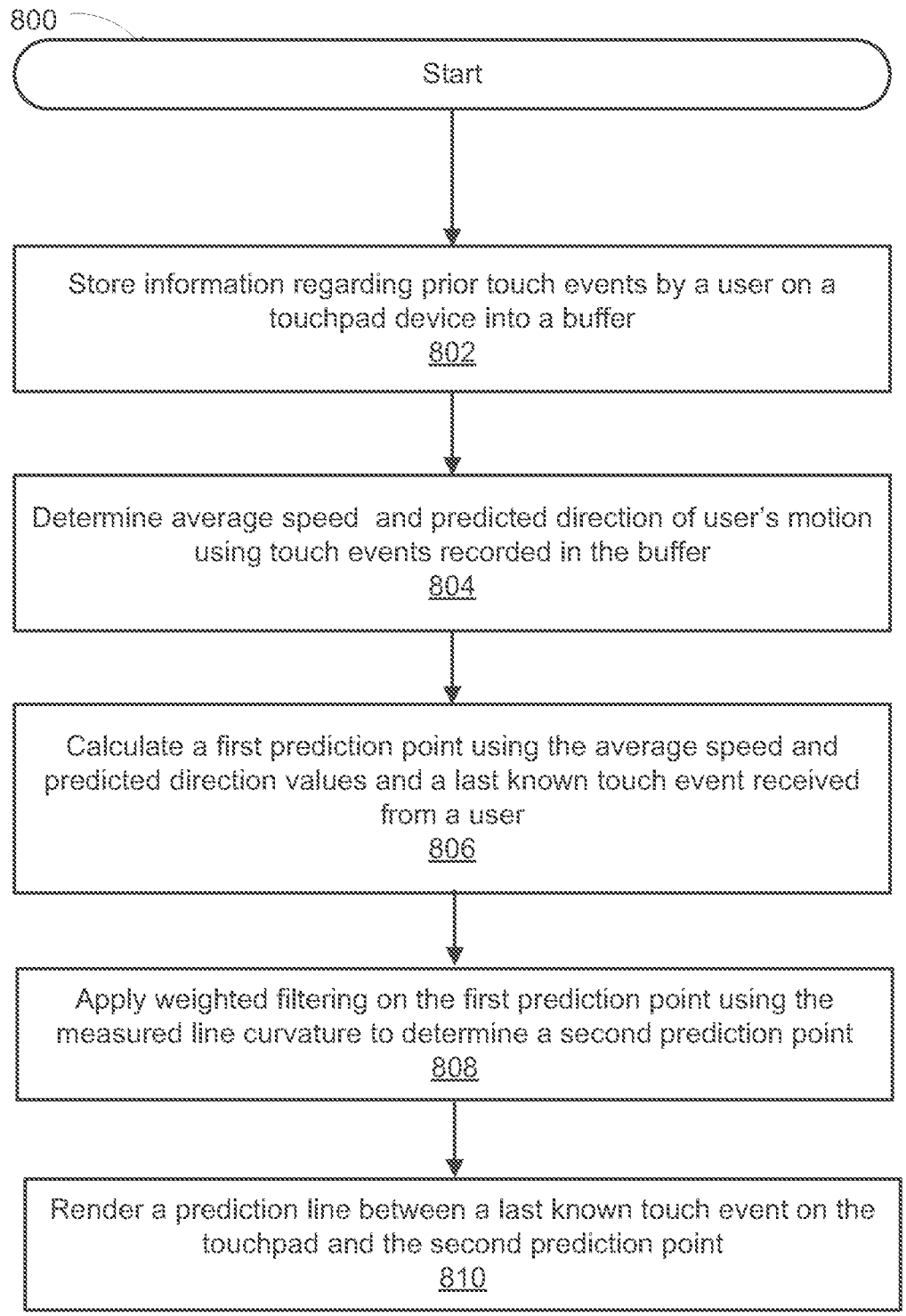
FIG. 8A depicts a flowchart of an exemplary computer controlled process of reducing perceived pen-to-ink latency on touch-screen devices in accordance with one embodiment of the present invention.

FIG. 8 depicts a flowchart 800 of an exemplary computer controlled process of reducing perceived pen-to-ink latency on touch-screen devices in accordance with one embodiment of the present invention. The invention, however, is not limited to the description provided by flowchart 800. Rather, it will be apparent to persons skilled in the relevant art(s) from the teachings provided herein that other functional flows are within the scope and spirit of the present invention. Flowchart 800 will be described with continued reference to exemplary embodiments described above, though the method is not limited to those embodiments.

At step 802, an application running on a touchpad device stores information regarding prior touch events detected on the device into an event buffer. As mentioned above, this information can comprise XY position, size, pressure and timestamp of the events, which represent a user interaction with the touch screen, e.g., a finger or a stylus.

At step 804, using the information in the event buffer, the application determines the average speed and predicted direction of a user's motion.

At step 806, it calculates a first predicted point using the following formula as explained above:

PP=LKP+NPD*(APL+TDL)*AS, wherein PP in the formula above is the first predicted point, LKP is the last known point, NPD is the normalized prediction direction, APL is pen latency (estimated average pen-to-ink latency measured with high-speed camera), TDL is touch delivery latency, and AS is the average pen speed measured in pixels/ms. APL and TDL, as discussed above, are constants that are device dependent. Further LKP is a last known touch position received from a user.

At step 808, weighted filtering is applied to the first prediction point using a measured line curvature value to determine a second prediction point.

Finally, at step 810, a predictive line is plotted or rendered between a last known touch event on the touchpad and the second prediction point.

Figure 8B:
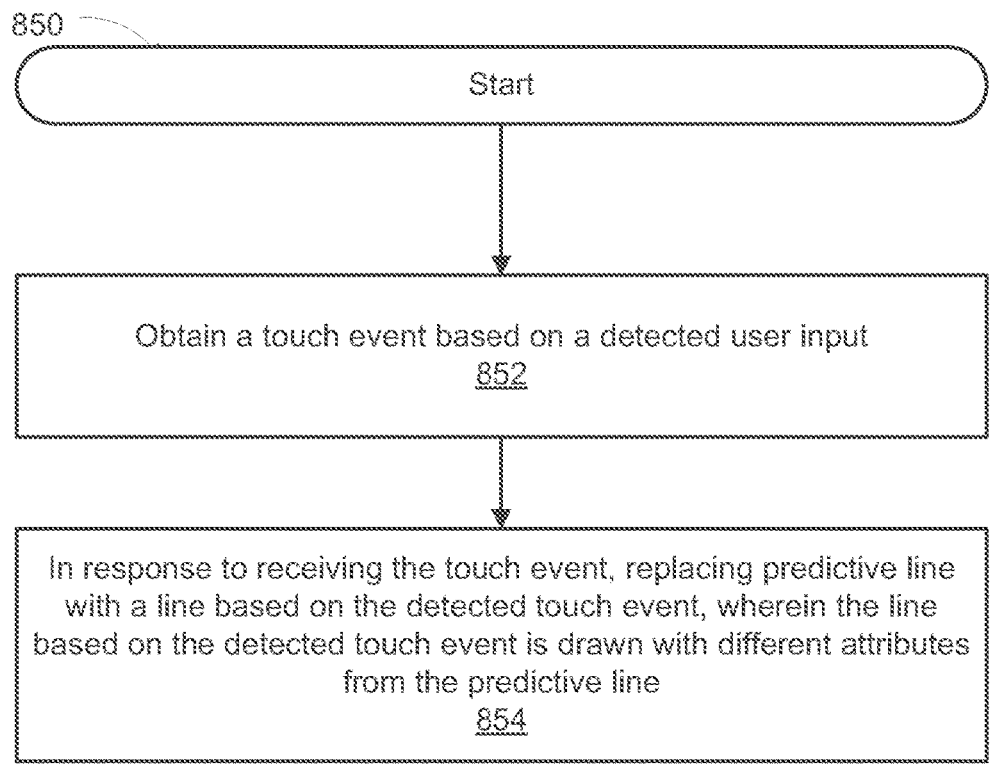
FIG. 8B depicts a flowchart of an exemplary computer controlled process of replacing predictive line segments with lines based on actual touch events from a user on touch-screen devices in accordance with one embodiment of the present invention.

FIG. 8B depicts a flowchart 850 of an exemplary computer controlled process of replacing predictive line segments with lines based on actual touch events from a user on touch-screen devices in accordance with one embodiment of the present invention. The invention, however, is not limited to the description provided by flowchart 850. Rather, it will be apparent to persons skilled in the relevant art(s) from the teachings provided herein that other functional flows are within the scope and spirit of the present invention. Flowchart 850 will be described with continued reference to exemplary embodiments described above, though the method is not limited to those embodiments.

At step 852, the application obtains a touch event based on a detected user input for which a predictive line was plotted at step 810 of flowchart 800.

At step 854, in response to receiving the touch event, the application removes and replaces, e.g., with an undo operation the predictive line with a line based on the detected user input. In one embodiment, the line based on the detected touch event is drawn with different screen attributes from the predictive line.

Figure 9:
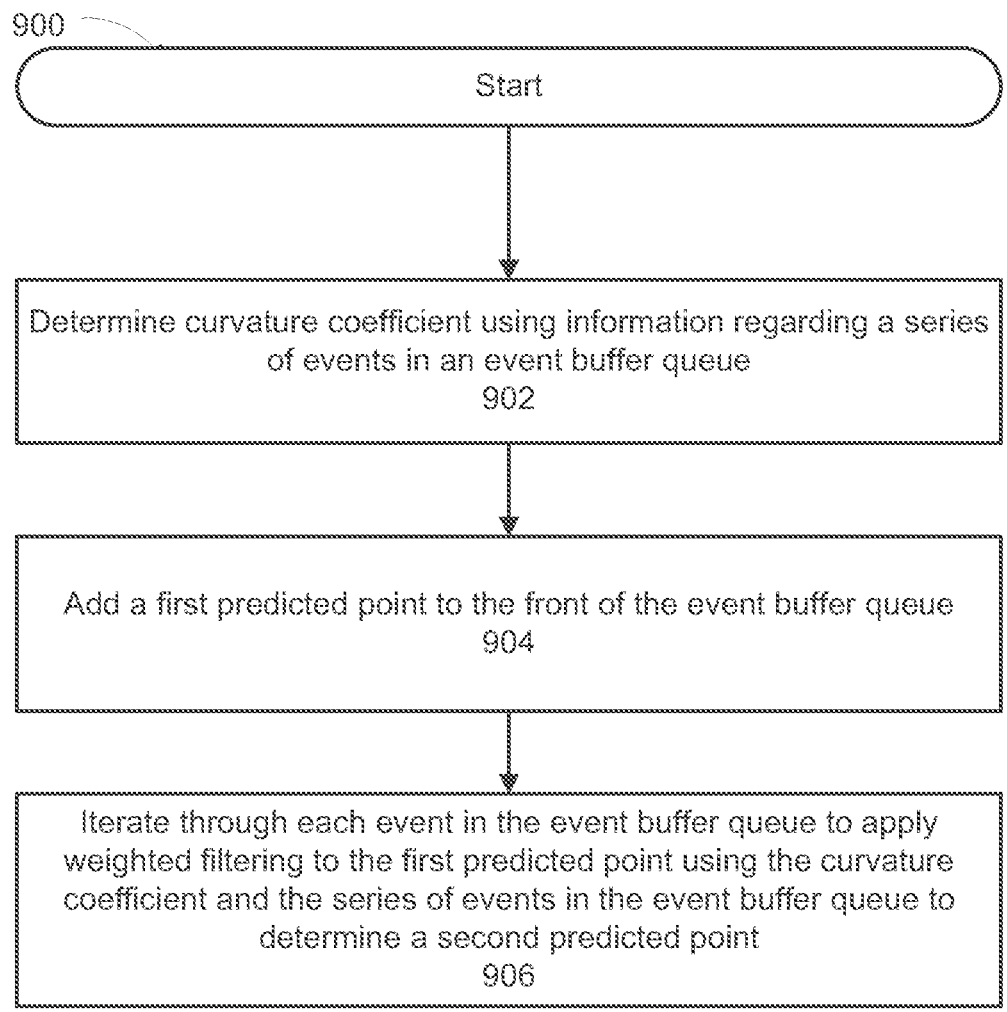
FIG. 9 depicts a flowchart of an exemplary computer controlled process of determining a final prediction point on a predictive line using a preliminary prediction point and a measured line curvature in accordance with one embodiment of the present invention.

FIG. 9 depicts a flowchart 900 of an exemplary computer controlled process of determining a final prediction point on a predictive line using a preliminary prediction point and a measured line curvature in accordance with one embodiment of the present invention. The invention, however, is not limited to the description provided by flowchart 900. Rather, it will be apparent to persons skilled in the relevant art(s) from the teachings provided herein that other functional flows are within the scope and spirit of the present invention. Flowchart 900 will be described with continued reference to exemplary embodiments described above, though the method is not limited to those embodiments.

At step 902, the application first determines the curvature coefficient using information regarding a series of events in the event buffer queue. For example, as discussed above, the procedure first determines the curvature of the user drawn line using the following formula: Curvature=max (0.5*(1+cos ($\alpha$))), wherein a is the vertex angle for triangles constructed using each point on the line for which there is a corresponding event in the buffer, and the points prior and subsequent to that point.

Next, at step 904, the first predicted point is added to the front of the event buffer queue.

Finally, at step 906, all the events in the event buffer queue are iterated through to apply weighted filtering to the first predicted point using the curvature coefficient and the series of prior events in the event buffer queue to determine the second predicted point.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method of reducing display latency on a touchpad device, said method comprising:
    storing information regarding a plurality of prior touch events on a touch screen of a touchpad device;
    determining, based on said information, an average speed and a predicted direction of motion regarding a user interaction with said touch screen;
    determining a line curvature using said information;
    calculating a first prediction point using said average speed, said predicted direction, and a point corresponding to the most recent touch event from said plurality of prior touch events on said touch screen;
    determining a second prediction point from said first prediction point using said line curvature, wherein said determining said second position includes:

iterating through a set that includes said information and said first prediction point to determine a weight using said line curvature and said information; and applying said weight to said first prediction point to determine said second prediction point; and rendering a line on said touch screen between said most recent touch event and said second prediction point.

2. The method of claim 1, wherein said information comprises X-Y coordinates, size, pressure, or timestamp.

3. The method of claim 1, wherein said calculating said first prediction point comprises:

determining a product of said average speed, said predicted direction and a latency value corresponding to said touchpad device; and summing said product with position coordinates of said most recent touch event to determine said first prediction point.

4. The method of claim 3, wherein said latency value comprises an average pen-to-ink latency for said touchpad device or a touch delivery latency for said touchpad device.

5. The method of claim 1, further comprising:

in response to receiving a new touch event, removing said line and rendering another line based on detected user input.

6. The method of claim 1, wherein said line is rendered with a display attribute different from a line drawn based on detected user input.

7. The method of claim 1, wherein said information is stored in a buffer, and elements of said buffer are replaced using a least recently used (LRU) replacement policy.

8. A non-transitory computer-readable storage medium having stored thereon computer executable instructions that, if executed by a computer system, cause the computer system to perform a method of reducing display latency on a touchpad device, said method comprising:

storing information regarding a plurality of prior touch events on a touch screen of a touchpad device;

determining, based on said information, an average speed and a predicted direction of motion regarding a user interaction with said touch screen;

determining a line curvature using said information;

calculating a first prediction point using said average speed, said predicted direction, and a point corresponding to the most recent touch event from said plurality of prior touch events;

determining a second prediction point from said first prediction point using said line curvature, wherein said determining said second prediction point includes:

iterating through a set that includes said information and said first prediction point to determine a weight using said line curvature and said information; and applying said weight to said first prediction point to determine said second prediction point; and rendering a line on said touch screen between said most recent touch event and said second prediction point.

9. The computer-readable medium as described in claim 8, wherein said information comprises X-Y coordinates, size, pressure, and timestamp.

10. The computer-readable medium as described in claim 8, wherein said calculating further comprises:

determining a product of said average speed, said predicted direction and a latency value corresponding to said touchpad device; and summing said product with position coordinates of said most recent touch event to determine said first prediction point.

11. The computer-readable medium as described in claim 8, wherein said method further comprises:

in response to receiving a new touch event, removing said line and rendering another line based on detected user input.

12. The computer-readable medium as described in claim 8, wherein said line is rendered with a display attribute different from a line drawn based on detected user input.

13. The computer-readable medium as described in claim 8, wherein said information is stored in a buffer, and elements of said buffer are replaced using a least recently used (LRU) replacement policy.

14. An apparatus comprising:

a body;

a bus;

a touch screen, wherein said touch screen is operable to detect a user touch input;

a memory;

a processor communicatively coupled to said memory and to said touch screen via said bus, wherein said processor is configured to:

store in memory information regarding a plurality of prior touch events on said touch screen;

determine, based on said information, an average speed and a predicted direction of motion regarding a user interaction with said touch screen;

determine a line curvature using said information;

calculate a first prediction point using said average speed, said predicted direction, and a point corresponding to the most recent touch event from said plurality of prior touch events;

determine a second prediction point from said first prediction point using said line curvature; and render a line on said touch screen between said most recent touch event and said second prediction point, wherein to determine said second prediction point, said processor is further configured to:

iterate though a set that includes said information and said first prediction point to determine a weight using said line curvature and said information; and apply said weight to said first prediction point to determine said second prediction point.

15. The apparatus of claim 14, wherein in response to receiving a new touch event, said processor is further configured to remove said line and render another line based on detected user input.

16. The apparatus of claim 14, wherein said information comprises X-Y coordinates, size, pressure, or timestamp.

17. The apparatus of claim 14, wherein said line is rendered with a display attribute different from a line drawn based on detected user input.

18. The apparatus of claim 14, wherein said information is stored in a buffer, and elements of said buffer are replaced using a least recently used (LRU) replacement policy.

* * * * *